United States Patent
Choi et al.

(10) Patent No.: US 11,104,346 B2
(45) Date of Patent: Aug. 31, 2021

(54) AUTONOMOUS VEHICLE CONTROL SYSTEM AND AUTONOMOUS VEHICLE CONTROL METHOD USING THE SAME

(71) Applicants: HYUNDAI MOTOR COMPANY, Seoul (KR); KIA MOTORS CORPORATION, Seoul (KR)

(72) Inventors: Eun Young Choi, Seoul (KR); Min Sang Yu, Hwaseong-si (KR); Dong Il Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/871,985

(22) Filed: May 11, 2020

(65) Prior Publication Data

US 2021/0197831 A1 Jul. 1, 2021

(30) Foreign Application Priority Data

Dec. 27, 2019 (KR) .......................... 10-2019-0176343

(51) Int. Cl.
*B60W 40/08* (2012.01)
*G07C 5/08* (2006.01)
(Continued)

(52) U.S. Cl.
CPC ............ *B60W 40/08* (2013.01); *B60W 40/09* (2013.01); *G07C 5/0816* (2013.01); *G08B 21/18* (2013.01);
(Continued)

(58) Field of Classification Search
CPC ........ G08B 21/00; G08B 21/02; G08B 21/18; G08B 21/182; G06K 9/00624; G06K 9/00832; G06K 9/00845; B60W 40/00; B60W 40/0818; B60W 40/0872; B60W 40/09; B60W 2540/221; B60W 2540/225;
(Continued)

(56) References Cited

U.S. PATENT DOCUMENTS

2013/0154854 A1* 6/2013 Chen ................ G08G 1/096775
340/905
2016/0009175 A1* 1/2016 Mcnew ............. G01C 21/3652
340/438

(Continued)

*Primary Examiner* — Van T Trieu

(57) ABSTRACT

An autonomous vehicle may include a driver monitoring device that generates driver monitoring information while driving in an autonomous driving mode, a perception-response feature learning device that measures a perception response time of a driver for each warning notification type based on the driver monitoring information and learns perception response features of the driver based on the measured perception response time of the driver for each warning notification type, a warning notification scenario determining device that determines a customized warning notification scenario for the driver based on of the learned perception response features, and a driver notification providing device that outputs a warning notification based on an output corresponding to each warning notification type, and an autonomous driving information recording device that stores autonomous driving information collected during driving.

28 Claims, 7 Drawing Sheets

(51) Int. Cl.
*B60W 40/09* (2012.01)
*G08B 21/18* (2006.01)
*B60W 50/16* (2020.01)
*B60W 60/00* (2020.01)
*B60W 50/00* (2006.01)
*B60W 50/14* (2020.01)
*G07C 5/00* (2006.01)

(52) U.S. Cl.
CPC ......... *B60W 50/16* (2013.01); *B60W 60/0053* (2020.02); *B60W 60/00188* (2020.02); *B60W 2040/0818* (2013.01); *B60W 2040/0872* (2013.01); *B60W 2050/0072* (2013.01); *B60W 2050/143* (2013.01); *B60W 2050/146* (2013.01); *B60W 2540/229* (2020.02); *G07C 5/008* (2013.01)

(58) Field of Classification Search
CPC ..... B60W 2540/227; B60W 2540/229; B60W 2540/30; B60W 2754/00; B60W 2754/10
See application file for complete search history.

(56) References Cited

U.S. PATENT DOCUMENTS

2017/0291543 A1* 10/2017 Goldman-Shenhar ....................... G08G 1/166
2017/0355377 A1* 12/2017 Vijaya Kumar ...... B60W 40/08

* cited by examiner

| AUTOMATION LEVELS | SAE CLASSIFICATION CRITERIA | SYSTEM CAPABILITY | DRIVER CAPABILITY |
|---|---|---|---|
| LEVEL 0 | NO AUTOMATION | PROVIDE ONLY TEMPORARY EMERGENCY INTERVENTION OR WARNING | DRIVER PERFORMS ALL DRIVING TASKS |
| LEVEL 1 | DRIVER ASSISTANCE | PERFORM SOME DRIVING FUNCTIONS SUCH AS STEERING AND ACCELERATION/DECELERATION UNDER CONTROL OF DRIVER WHO PERFORM DRIVING FUNCTIONS IN NORMAL OPERATING SECTION | DRIVER DETERMINE WHETHER/WHEN SYSTEM OF LEVEL 1 IS TO OPERATE AND PERFORMS ALL DRIVING TASKS (INCLUDING MONITORING OF DRIVING ENVIRONMENT/VEHICLE DRIVING/SYSTEM OF LEVEL 1 AND IMMEDIATE EMERGENCY MEASURES) EXCEPT STEERING OR ACCELERATION/DECELERATION PEDAL OPERATION |
| LEVEL 2 | PARTIAL AUTOMATION | PERFORM DRIVING FUNCTIONS SUCH AS STEERING AND ACCELERATION/DECELERATION INSTEAD UNDER CONTROL OF DRIVER WHO IS MONITORING STEERING AND ACCELERATION/DECELERATION DEVICES | DRIVER DETERMINE WHETHER/WHEN SYSTEM IS TO OPERATE AND PERFORMS ALL DRIVING TASKS (INCLUDING MONITORING OF DRIVING ENVIRONMENT/VEHICLE DRIVING/SYSTEM OF LEVEL 2 AND IMMEDIATE EMERGENCY MEASURES) EXCEPT STEERING OR ACCELERATION/DECELERATION PEDAL OPERATION |
| LEVEL 3 | CONDITIONAL AUTOMATION | TRANSFER DRIVING CONTROL TO DRIVER IN CIRCUMSTANCES OUTSIDE CONDITIONS AND PERFORM DRIVING FUNCTIONS SUCH AS STEERING AND ACCELERATION/DECELERATION | DRIVER DETERMINE WHETHER/WHEN SYSTEM IS TO OPERATE AND PERFORMS ALL DRIVING TASKS (RECEIVE CONTROL WHEN SYSTEM OF LEVEL 3 REQUEST TRANSFER OF CONTROL AND TAKE EMERGENCY MEASURES) EXCEPT STEERING, ACCELERATION/DECELERATION PEDAL OPERATION AND MONITORING OF DRIVING ENVIRONMENT |
| LEVEL 4 | HIGH AUTOMATION | SYSTEM PERFORM ALL DRIVING TASKS UNDER CONTROL OF THE DRIVER FOR EXTREMELY EXCEPTIONAL CIRCUMSTANCES | SELECTIVELY TAKE EMERGENCY MEASURES WHEN SYSTEM OF LEVEL 4 REQUEST TRANSFER OF CONTROL |
| LEVEL 5 | FULL AUTOMATION | PERFORM FULL-RANGE AUTOMATED CRUISE CONTROL WHICH COPE WITH ALL SITUATIONS WITHOUT INTERVENTION OF DRIVER | DRIVER DETERMINE WHETHER TO OPERATE SYSTEM AND PERFORM NO ALL DRIVING TASKS |

FIG. 1

AUTONOMOUS VEHICLE CONTROL SYSTEM AND AUTONOMOUS VEHICLE CONTROL METHOD USING THE SAME

CROSS-REFERENCE TO RELATED APPLICATION

The present application claims priority to and the benefit of Korean Patent Application No. 10-2019-0176343, filed on Dec. 27, 2019, which is incorporated herein by reference in its entirety.

TECHNICAL FIELD

The present disclosure relates to an autonomous vehicle, and more particularly, to autonomous vehicle control technology for learning perception-response features to warning notifications for each driver and providing an optimized warning notification scenario for each driver to take appropriate and quick measures in case of vehicle hacking and risk detection.

BACKGROUND

The statements in this section merely provide background information related to the present disclosure and may not constitute prior art.

An autonomous vehicle is generally defined as a vehicle capable of autonomously driving, such as determining a risk by recognizing a surrounding environment without a driver or passenger's operation based on autonomous driving technology and planning a driving path, in such a manner to organically connect all elements of a vehicle-infrastructure.

Software for providing advanced judgment and response capabilities to the autonomous vehicle has been actively developed because objects which the autonomous vehicle is to cope with become complicated and the autonomous vehicle is subjected to unexpected situations, such as overtaking a preceding vehicle on a road or avoiding a danger by recognizing pedestrians and signals in the city during driving.

Recently, as the autonomous driving technology has been highly developed, partial autonomous vehicles have begun to be mass-produced, and study for various situations in driving of the autonomous vehicle is being conducted. However, in the autonomous vehicles of the SAE (Automation of Automotive Engineers) automation level 2 or 3, it is inevitable to switch control between an autonomous vehicle system and a driver. In such a situation for control switch, in-depth research on Driver-Vehicle Interaction (DVI) is required to promote proper communication between the driver and the system.

When it is required to switch control while the autonomous vehicle is driving in various driving situations, it is necessary to provide optimized notifications for each driving situation and the driver's state by using various notification methods.

A key element in identifying accident liability for an autonomous vehicle is identifying who owns control for the vehicle at the time of the accident.

In a state in which the control is transferred to the system, the driver, in principle, does not assume the duty to pay attention to driving, and even when an accident occurs, the driver's violation of the duty to pay attention is not recognized.

However, when the system requests the driver to switch control, the driver is obliged to immediately switch to a manual mode. When an accident occurs due to the driver disregarding the duty to switch the control, the driver may be violated by the duty of attention.

Unlike general vehicle accidents, in the case of autonomous vehicle accidents, automakers are expected to greatly expand their responsibilities because automakers must bear product liability for defects in the autonomous driving system as well as for the defects of the vehicle itself.

Accordingly, there is a demand for an autonomous driving system capable of determining whether the system has requested switch of control, identifying who the control is accurately owned when the accident occurs and providing an effective driver notification method for smooth switching of the control.

SUMMARY

An aspect of the present disclosure provides an autonomous vehicle control system and an autonomous vehicle control method using the same.

Another aspect of the present disclosure is to provide an autonomous vehicle control system capable of providing an optimized warning notification scenario for each driver by learning perception-response features to warning notifications for each driver, and take appropriate and quick measures in case of vehicle hacking and risk detection.

Still another aspect of the present disclosure is to provide an autonomous vehicle driving information recording system capable of actively protecting a driver and preventing a vehicle accident risk by detecting a system malfunction or a hacking situation through a real-time comparison between a warning notification outputted in each warning notification scenario phase and a driver monitoring result, recording a result of the detection in an internal memory of the vehicle and immediately informing a central center of the result of the detection.

Still another aspect of the present disclosure is to provide an autonomous vehicle driving information recording system capable of taking appropriate emergency measures in such a way that an autonomous vehicle records control transfer failure information in an internal memory of the vehicle when control of the autonomous vehicle is not normally switched and transmits driver biometric information and surrounding environment information to a central center.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous vehicle may include a driver monitoring device that generates driver monitoring information while driving in an autonomous driving mode, a perception-response feature learning device that measures a perception response time of a driver for each warning notification type based on the driver monitoring information and learns perception response features of the driver based on the measured perception response time of the driver for each warning notification type, a warning notification scenario determining device that determines a customized warning notification scenario for the driver based on a result of learning of the perception response features, a driver notification providing device that outputs a warning notification by using output means corresponding to the warning notification type for each warning notification scenario phase, and an autonomous driving information recording device that stores autonomous driving information collected during driving.

In some forms of the present disclosure, the autonomous driving information recording device may include first to third storage devices, and the autonomous driving information may be recorded in at least one of the first to third storage devices according to an event.

In some forms of the present disclosure, the autonomous vehicle may further include a hacking determining device configured to determine whether hacking occurs by identifying consistency between a driver monitoring result and a corresponding warning notification output for each warning notification scenario phase, and the hacking determining device may record hacking occurrence information in the second storage device when the hacking occurs as a result of the determination.

In some forms of the present disclosure, the hacking occurrence information may be transmitted to a central center through a communication network In some forms of the present disclosure, the autonomous vehicle may further include a driving environment information collecting device that collects driving environment information, and the perception response feature learning device may correct the measured perception response time based on the driving environment information and learn the perception response features of the driver based on the corrected perception response time.

In some forms of the present disclosure, the warning notification type may include a visual warning notification type, an audible warning notification type and a tactile warning notification type, and a warning notification message may be output according to at least one of the warning notification types in each phase of the warning notification scenario.

In some forms of the present disclosure, the autonomous vehicle may further include a control switch determining device that switches control from a system to the driver when the hacking occurs.

In some forms of the present disclosure, the autonomous vehicle may further include a control transfer status identifying device that determines whether transfer of the control from the system to the driver is normally completed, wherein a driving mode is switched from the autonomous driving mode to a driver driving mode when the transfer of the control from the system to the driver is normally completed.

In some forms of the present disclosure, the control transfer status identifying device may record control transfer failure information in the third storage device when it is determined that the transfer of the control from the system to the driver has failed.

In some forms of the present disclosure, the control transfer failure information may be transmitted to a central center through a communication network.

In some forms of the present disclosure, the central center may request emergency measures for the autonomous vehicle from an emergency rescue center when receiving the control transfer failure information.

In some forms of the present disclosure, the central center may provide failure of the control transfer to the autonomous vehicle or a terminal of the driver when receiving the control transfer failure information.

In some forms of the present disclosure, the autonomous vehicle may further include a seat control device that restores a seat of the autonomous vehicle to a specified position and operates a seat belt pretensioner when the control transfer status identifying device determines that the control transfer has failed.

In some forms of the present disclosure, the autonomous vehicle may further include a biometric information collecting device that collects driver biometric information, and driving environment information and the driver biometric information may be recorded in the first storage device and then transmitted to a central center when driver distraction is detected based on a result of analysis of the driver monitoring information.

In some forms of the present disclosure, the driving environment information and the driver biometric information may be transmitted to the central center through a communication network.

In some forms of the present disclosure, the driver biometric information may include at least one of facial recognition information, pulse information, pupil tracking information, information on respiration number per unit time, electrocardiogram information, body temperature information, electroencephalogram information, or skin electroconductive information, and the driving environment information may include at least one of current time zone information, current location information, driving road information, driving line information, driving speed information, speed limit information of a road on which the autonomous vehicle is driving, indoor/outdoor vehicle video image information or ambient noise information.

According to another aspect of the present disclosure, an autonomous vehicle control method in an autonomous vehicle may include collecting driver monitoring information while driving in an autonomous driving mode, measuring a perception-response time of a driver for each warning notification type based on the driver monitoring information, learning perception-response features of the driver based on the measured perception-response time of the driver for each warning notification type, determining a customized warning notification scenario for the driver based on a result of the learning and recording autonomous driving information collected during driving in an autonomous driving information recording device provided in the autonomous vehicle.

In some forms of the present disclosure, the autonomous vehicle control method may further include determining whether hacking occurs by identifying consistency between a driver monitoring result and a corresponding warning notification output for each warning notification scenario phase and recording hacking occurrence information in a second storage device when the hacking occurs as a result of the determination.

In some forms of the present disclosure, the autonomous vehicle control method may further include collecting the driving status information, storing the driving status information in the autonomous driving information recording device, and correcting the measured perception-response time based on the driving status information, and the perception-response features of the driver may be learned based on the corrected perception-response time.

In some forms of the present disclosure, the autonomous vehicle control method may further include outputting a predetermined warning notification informing the driver of a need to switch control from a system to the driver when the hacking occurs.

In some forms of the present disclosure, the autonomous vehicle control method may further include recoding control transfer failure information in the autonomous driving information recording device when transfer of the control has failed from the system to the driver.

In some forms of the present disclosure, the autonomous vehicle control method may further include detecting driver distraction based on the driver monitoring information, collecting driver biometric information and driving environment information when the driver distraction is detected, and recording the driver biometric information and the driving environment information in the autonomous driving information recording device, and the driver biometric information and the driving environment information may be transmitted to a central center to take emergency measures for the autonomous vehicle.

According to still another aspect of the present disclosure, an autonomous vehicle control method may include detecting an event while driving in an autonomous driving mode, identifying a class of the detected event, classifying information related to the detected event according to the class of the identified event and storing the information related to the detected event in an autonomous driving information recording device, transmitting the information related to the detected event to a central center when the class of the identified event corresponds to a preset level and transmitting no information related to the detected event to the central center when the class of the identified event does not correspond to the preset level.

In some forms of the present disclosure, the event while driving in the autonomous driving mode may include at least one of a hacking occurrence event, a control transfer failure event, a vehicle failure event, or a driver distraction event.

In some forms of the present disclosure, the preset level may be set in advance based on at least one of reliability, stability, or importance of the information related to the detected event.

In some forms of the present disclosure, the central center may request emergency measures from an emergency rescue center according to reception of the emergency rescue request message.

In some forms of the present disclosure, the central center may transmit a predetermined message indicating that the emergency measures are taken according to the emergency rescue request to the autonomous vehicle or a terminal of a driver of the autonomous vehicle in which the emergency rescue request message is received after the request of the emergency measures.

In some forms of the present disclosure, the autonomous driving information recording device may include a plurality of storage devices, and the information related to the detected event may be classified according to the identified event class and stored in the plurality of storage devices.

According to an aspect of the present disclosure, an autonomous vehicle may include an autonomous driving information recording device that records autonomous driving information collected during driving, and a control device that classifies information related to a detected event according to a class identified corresponding to the detected event, stores the information in the autonomous driving information recording device when the event is detected while driving in an autonomous driving mode, transmits the information related to the detected event when the identified class corresponds to a preset class, and transmits no information related to the detected event when the identified class does not correspond to the preset class.

In some forms of the present disclosure, the event while driving in the autonomous driving mode may include at least one of a hacking occurrence event, a control transfer failure event, a vehicle failure event, or a driver distraction event.

In some forms of the present disclosure, wherein the preset level may be set in advance based on at least one of reliability, stability, or importance of the information related to the detected event.

In some forms of the present disclosure, the central center may request emergency measures from an emergency rescue center according to reception of the emergency rescue request message.

In some forms of the present disclosure, the central center may transmit a predetermined message indicating that the emergency measures are taken according to the emergency rescue request to the autonomous vehicle or a terminal of a driver of the autonomous vehicle in which the emergency rescue request message is received after the request of the emergency measures.

In some forms of the present disclosure, the autonomous driving information recording device may include a plurality of storage devices, and the control device may classify the information related to the detected event according to the identified event class and store the information in the plurality of storage devices.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a table in which automation levels of an autonomous vehicle in one form of the present disclosure are defined;

Figure 2:
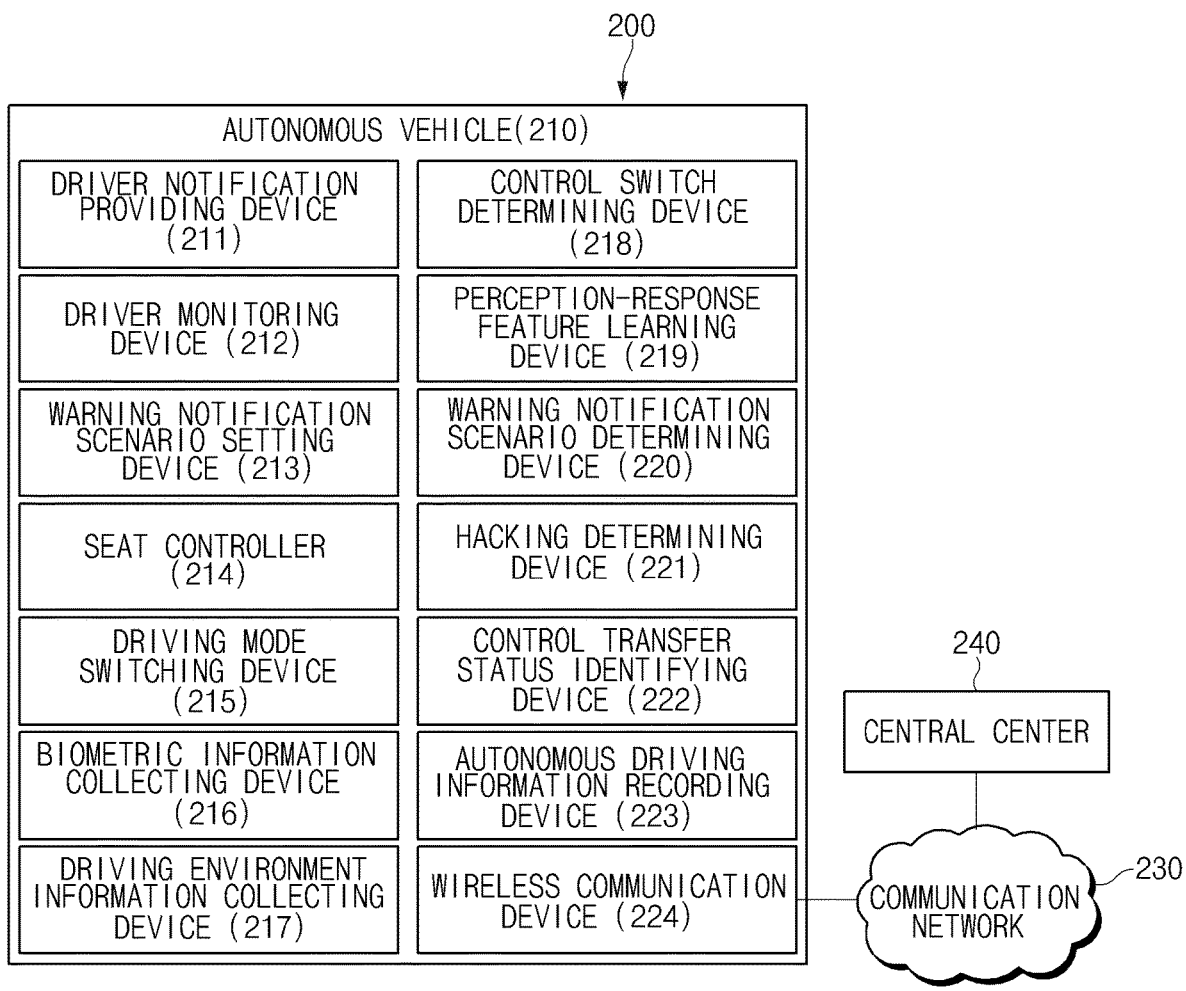
FIG. 2 is a diagram for describing a structure of an autonomous vehicle control system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, forms of the present disclosure will be described in detail with reference to FIGS. 1 to 7.

FIG. 1 is a table in which automation levels of an autonomous vehicle in some forms of the present disclosure are defined.

An autonomous vehicle may refer to a vehicle that itself recognizes a driving environment, determines a risk, and drives safely while controlling a driving path to minimize a driver's driving operation.

In other words, the autonomous vehicle may be a vehicle capable of driving, performing control and being parked without human intervention. Then autonomous driving technology (the ability to drive a car without the driver's active control or monitoring), which is the core basis of the autonomous vehicle, has focused on a most advanced vehicle and the present concept thereof may correspond to a goal-oriented concept under the assumption that an autonomous vehicle full automation is produced and is driving.

In an autonomous vehicle control method according to the present disclosure, the autonomous vehicle may correspond to level 3 (conditional automation) among automation levels of autonomous driving illustrated in FIG. 1, but is not limited thereto, and may be applicable to all levels of autonomous vehicles in which a control switch situation may occur.

The classification of the automation levels of autonomous vehicles based on the SAE (Society of Automotive Engineers) is shown in the table of FIG. 1. Here, SAE means the American Association of Automotive Engineers.

FIG. 2 is a diagram for describing a structure of an autonomous vehicle control system in some forms of the present disclosure.

Referring to FIG. 2, an autonomous vehicle control system 200 may largely include an autonomous vehicle 210, a central center 240, and a communication network 230. Here, the communication network 230 may include wireless and wired communication networks, and the wireless communication network may include a 4G Long Term Evolution (LTE) communication network, a 5G NR (New Radio) communication network and the like.

The autonomous vehicle 210 and the central center 240 may exchange information with each other through the communication network 230.

The autonomous vehicle 210 may include a driver notification providing device 211, a driver monitoring device 212, a warning notification scenario setting device 213, a seat controller 214, a driving mode switching device 215, a biometric information collecting device 216, a driving environment information collecting device 217, a control switch determining device 218, a perception-response feature learning device 219, a warning notification scenario determining device 220, a hacking determining device 221, a control transfer status identifying device 222, an autonomous driving information recording device 223, a wireless communication device 224, and a control device 225.

The driver notification providing device 211 may output a notification message in various forms such as visual, tactile, and audible forms according to a set warning notification scenario. The driver notification providing device 211 may include a display, a speaker, a beeper, a haptic module, a notification lighting module, a vibration module, a heating module, or the like but is not limited thereto.

The driver monitoring device 212 may monitor information for identifying whether driver distraction occurs. For example, the driver monitoring device 212 may monitor a steering wheel operation state, a pupil movement state, a speech recognition state or the like of the driver using various sensors and cameras provided in the vehicle. The control device 225 may determine whether distraction, drowsy driving, phone conversation or the like of the driver occurs based on driver monitoring information.

The warning notification scenario setting device 213 may set a warning notification output method for each warning notification scenario phase.

For example, the warning notification scenario may be set to output a warning sound and a warning light (that is, audible/visual warning) as a first phase warning notification, and output a haptic vibration and a warning light (that is, tactile/visual warning) as a second phase warning notification, and output a warning sound, a warning light and a haptic vibration (that is, an audible/visual/tactile warning) as warning notification according to a control switch request, but is not limited thereto.

In particular, the autonomous vehicle 210 in some forms of the present disclosure may adaptively determine the warning notification scenario based on a response speed (or time required for the response) for each warning notification type for each driver. As an example, the autonomous vehicle 210 may learn which type of warning notification each driver responds to fastest, and determine a warning notification scenario corresponding to each driver based on a result of the learning.

The seat controller 214 may adjust the position and posture of a vehicle seat under the control of the control device 225.

As an example, when it is required to switch control from the system to the driver, but the autonomous vehicle 210 stops on a road due to an emergency occurrence, for example, an unconscious state of the vehicle driver, the seat controller 214 may adjust a seat cushion and a seatback to normal positions preset by the manufacturer and then operate a seat belt pretensioner.

Here, the seat belt pretensioner may mean a function to mechanically sense a deceleration of the vehicle separately from an airbag system and then rewind the seat belt by the operation of a gas generator, and may instantly rewind the seat belt to minimize a range for a passenger to move forward and maximize the effect of the seat belt in the case of a head-on vehicle collision.

The driving mode switching device 215 may perform a function of switching a driving mode from an autonomous driving mode to a driver driving mode or from the driver driving mode to the autonomous driving mode according to a control signal of the control device 225.

As an example, when it is necessary to switch the control from the system to the driver, the autonomous vehicle 210 may output a predetermined control switch request notification message and wait for the driver's input to a takeover switch.

Here, the takeover switch may include the type of a button, a lever, and the like provided on one side of the steering wheel, but is only one form of the present disclosure, and may be implemented using a display such as a head-down display (HDD) and a head-up display (HUD), a gesture recognition sensor, a speech recognition sensor, a face recognition sensor or the like.

The biometric information collecting device 216 may collect various biometric signals and (or) biometric information through various biometric sensors provided in the autonomous vehicle 210 and (or) biometric sensors mounted on an electronic device worn or possessed by a driver.

For example, the electronic device for collecting biometric information may include a wearable device having the form of a watch, glasses, a hat, a hairband a, ring, a bracelet, a ball, gloves, a helmet, shoes, a smart phone, or the like, but is not limited thereto.

As an example, the biometric information collected by the biometric information collecting device 216 may include facial recognition information, pulse information, pupil tracking information, information on a respiration rate per unit time, electrocardiogram information, body temperature information, electroencephalogram information, and skin electroconductive information and the like, but are not limited thereto.

The driving environment information collecting device 217 may collect various pieces of information necessary for identifying a vehicle state while driving. As an example, the driving environment information may include current time/time zone information, current location information, road information—for example, a road type (including a highway/motorways/city road or the like), driving line information, and current driving speed information, speed limit information of a driving road, indoor/outdoor vehicle video image information, ambient noise information, and the like, but are not limited thereto.

The control switch determining device 218 may determine whether control switch is required for the autonomous vehicle 210 in consideration of driver monitoring information, warning notification output information, driver biometric information, and driving state information.

The control switch determining device 218 may determine that the control should be switched from the driver to the system when the driver's unconscious state is confirmed in the driver's driving mode.

The control switch determining device 218 may determine that it is required to switch control from the system to the driver when the system abnormality is detected or the risk of system hacking is detected in an autonomous driving mode.

For example, when a warning notification is output in a state in which driver distraction is not determined as a result of driver monitoring, the control switch determining device 218 may determine that the system is abnormal. That is, the control switch determining device 218 may detect the abnormality of the system by comparing the driver monitoring information and the warning notification output information for each warning notification scenario phase.

When the control switch determining device 218 determines that it is necessary to switch control, the control switch determining device 218 may transmit a predetermined control switch event signal to the control device 225. In this case, the control device 225 may allow the driver notification providing device 211 to output a predetermined warning notification message indicating that it is necessary to switch corresponding control.

The perception-response feature learning device 219 may measure a driver response time for a warning notification which is output in each phase according to a basic warning notification scenario based on the driver monitoring information, and learn perception-response features of a corresponding driver based on statistics on driver response times measured for each warning notification type. Here, the basic warning notification scenario may mean a warning notification scenario set by the manufacturer by default, but is only one form of the present disclosure and may also be a warning notification scenario set by a user.

The perception-response feature learning device 219 may determine an optimized warning notification scenario—that is, a user-customized warning notification scenario corresponding to a relevant driver according to the perception-response features which has been learned.

The warning notification scenario determining device 220 may determine a predetermined warning notification scenario based on a driver monitoring result and a result of the driver's perception-response to the output warning notification.

The hacking determining device 221 may detect a hacking risk by determining a correlation between the driver monitoring information and the warning notification output information.

When the hacking risk is detected, the hacking determining device 221 may transmit a predetermined hacking event signal to the control device 225.

When the control device 225 detects the hacking event, the control device 225 may store hacking occurrence information in the autonomous driving information recording device 223 and transmit the hacking occurrence information to the central center 240. Here, the hacking occurrence information may include, but is not limited to, hacking occurrence vehicle information, hacking occurrence location information, hacking occurrence time information, driver monitoring information and warning notification output information corresponding to the detected hacking event.

The control transfer status identifying device 222 may determine whether the control is normally transferred according to the control switch determination of the control switch determining device 218.

When it is determined that the control transfer is normally completed, the control transfer status identifying device 222 may generate and transmit a control transfer completion event signal to the control device 225. When it is determined that the control transfer fails, the control transfer status identifying device 222 may generate and transmit a control transfer failure event signal to the control device 225.

When the control device 225 detects the control transfer failure event signal, the control device 225 may record the control transfer failure information in the autonomous driving information recording device 223 and transmit the control transfer control failure information to the central center 240. Here, the control transfer failure information may include time information at which control transfer has failed, control switch request message information for which control transfer has failed, or the like, but is not limited thereto.

The autonomous driving information recording device 223 may store driver monitoring information, warning notification output information, driver response information, driver biometric information, seat position information, driving environment information, and the like.

In addition, the autonomous driving information recording device 223 may store perception-response feature information for each driver and a user-customized warning notification scenario determined based on the perception-response feature information. Here, the user-customized warning notification scenario may be dynamically updated according to a result of the continuous learning for driver-specific perception-response feature in the perception-response feature learning device 219.

Figure 3:
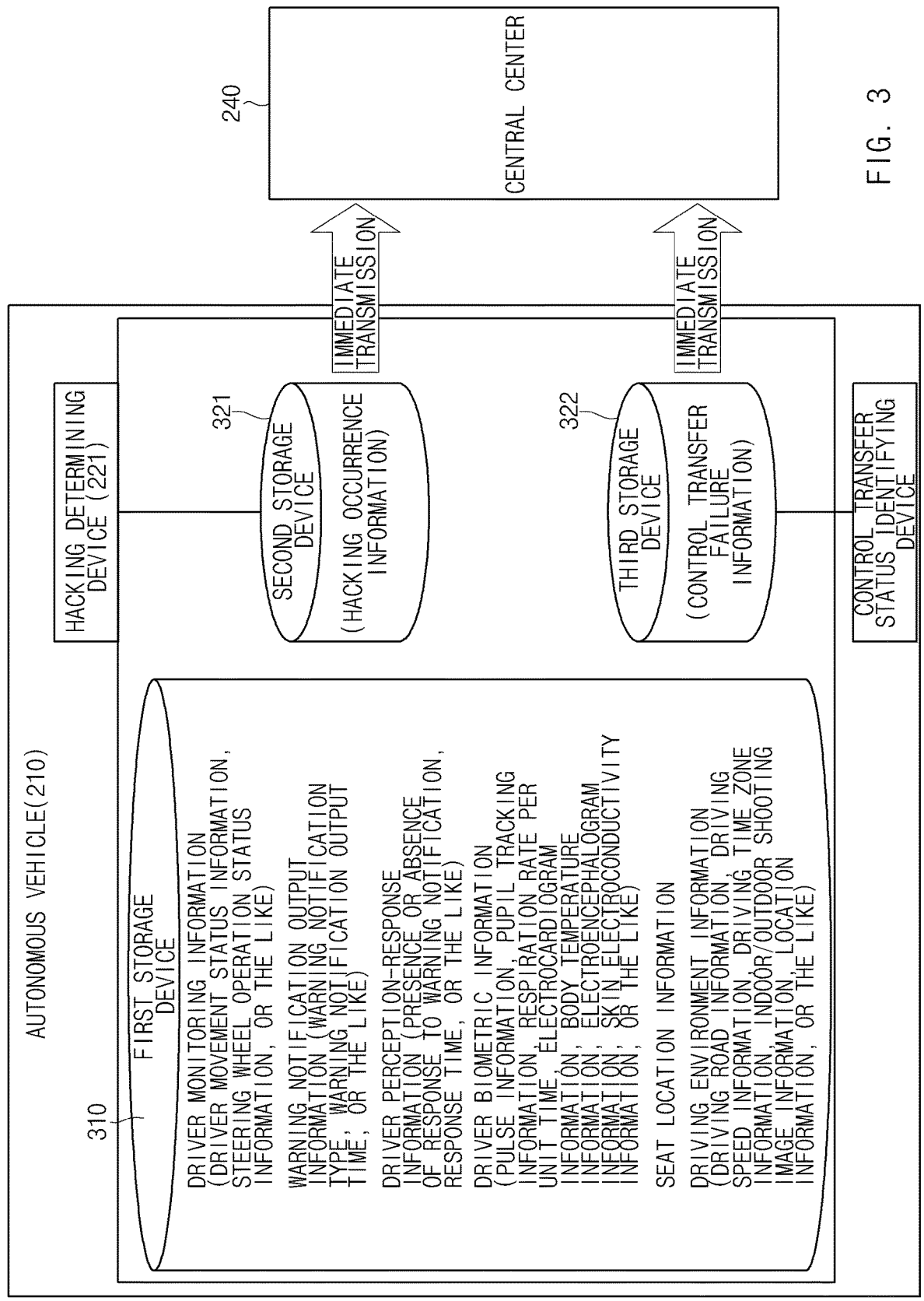
FIG. 3 is a view for explaining a structure of a database maintained in a storage device of an autonomous vehicle in one form of the present disclosure.

The autonomous driving information recording device 223 may store and maintain hacking occurrence information and control transfer failure information. Here, the hacking occurrence information and the control transfer failure information may be recorded and maintained in separate storage devices respectively, as shown in FIG. 3 to be described later.

The central center 240 may identify an autonomous vehicle in which a system hacking has occurred and an autonomous vehicle that has failed to transfer control, based on the information received from the autonomous vehicle 210.

The central center 240 may transmit a warning notification message indicating the hacking occurrence and guiding vehicle emergency measures to a driver terminal of the autonomous vehicle in which the hacking is detected.

In addition, the central center 240 may transmit a predetermined message for inducing the driver to switch from an autonomous driving mode to a driver driving mode, that is, a manual driving mode, to the driver terminal of the autonomous vehicle in which the hacking is detected.

The central center 240 may perform control to take emergency measures for a corresponding autonomous vehicle by calling an ambulance, a fire engine, a police car, or the like for the autonomous vehicle in which hacking occurrence has been detected or control switch has been failed.

The wireless communication device 224 may exchange information with the central center 240 through the communication network 230. In addition, the wireless communication device 224 may include positioning means (e.g., a GPS receiver) for receiving a signal from a positioning satellite (not shown) and calculating a current position of the autonomous vehicle 210.

The control device 225 may control the overall operation and input/output of the autonomous vehicle 210.

FIG. 3 is a diagram for describing a structure of a storage device provided in the autonomous vehicle 210 in some forms of the present disclosure.

Referring to FIG. 3, the autonomous driving information recording device 223 included in the autonomous vehicle 210 may include a first storage device 310 in which public information and (or) general event information is recorded, and second and third storage devices 321 and 322 in which specific event-related information is recorded.

The first storage device 310 may store driver monitoring information, warning alarm output information, driver perception-response information, driver biometric information, seat position information, driving environment information, or the like for each autonomous vehicle.

The hacking occurrence information may be recorded in the second storage device 321 by the hacking determining device 221, and control transfer failure information may be recorded in the third storage device 322 by the control transfer status identifying device 222.

The information recorded in the second storage device 321 and the third storage device 322 may be immediately transmitted to the central center 240 through the communication network 230.

Figure 4:
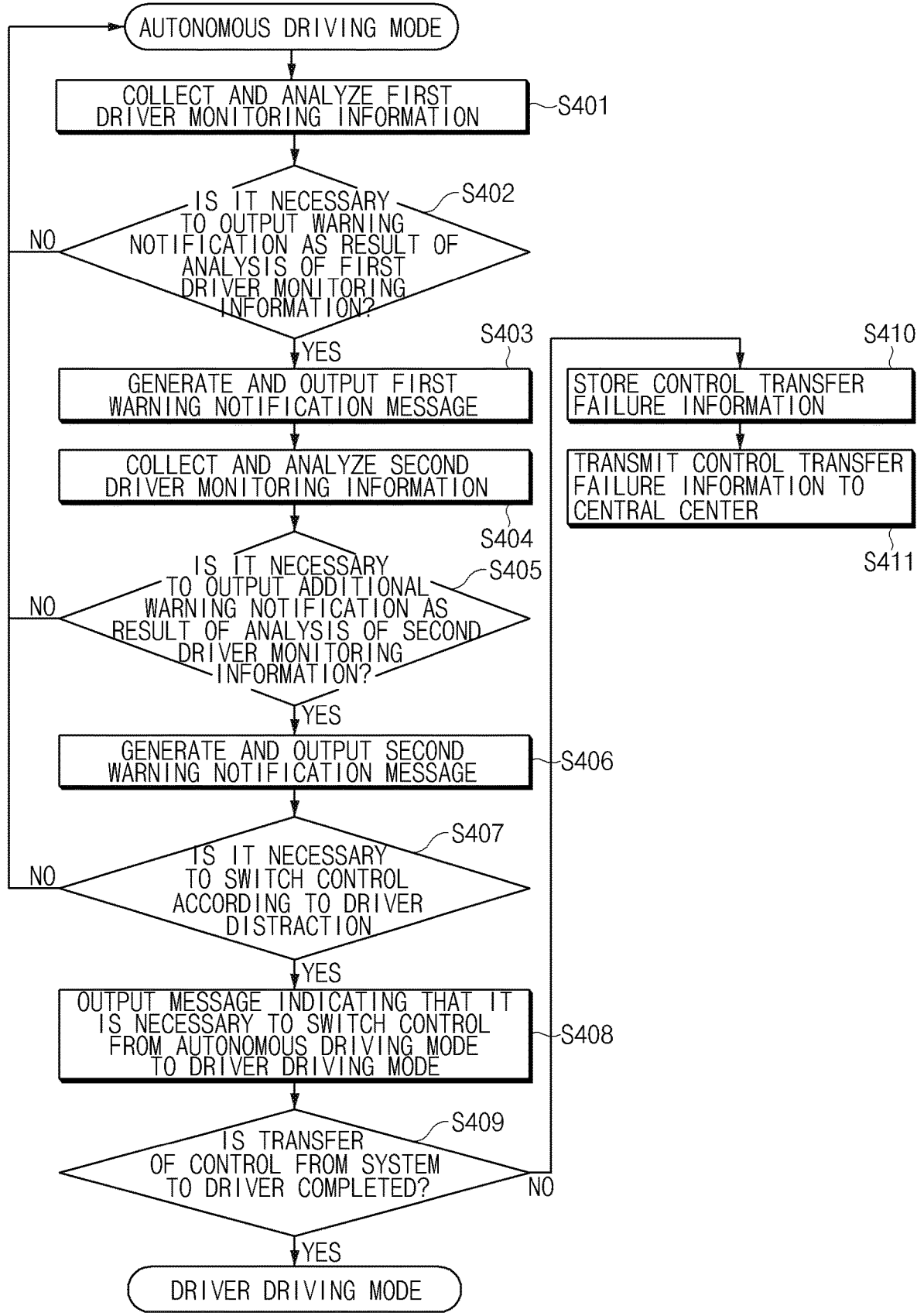
FIG. 4 is a flowchart for describing a procedure for transferring control in an autonomous vehicle in one form of the present disclosure.

FIG. 4 is a flowchart for describing a procedure for transferring control in an autonomous vehicle in some forms of the present disclosure.

Specifically, FIG. 4 illustrates an operation of the autonomous vehicle for transferring control from an autonomous driving mode to a driver driving mode.

Referring to FIG. 4, in the autonomous driving mode, the autonomous vehicle 210 may collect and analyze first driver monitoring information (S401).

The autonomous vehicle 210 may determine whether a warning notification output is necessary as a result of analysis of the first driver monitoring information (S402).

As a result of the determination, when the warning notification output is necessary, the autonomous vehicle 210 may generate and output a first warning notification message (S403).

The autonomous vehicle 210 may receive and analyze second driver monitoring information (S404). Here, the second driver monitoring information may include perception-response information of the driver with respect to the outputted first warning notification message.

The autonomous vehicle 210 may determine whether additional warning notification is necessary as a result of analysis of the second driver monitoring information (S405).

As a result of the determination, when the additional warning notification is necessary, the autonomous vehicle 210 may generate and output a second warning notification message (S406).

The autonomous vehicle 210 may determine whether it is necessary to switch control according to the distraction of the driver (S407). In one form of the present disclosure, the autonomous vehicle 210 may determine whether driver distraction occurs based on third driver monitoring information including the driver's perception-response information with respect to the outputted second warning notification message.

As a result of the determination, when it is necessary to switch the control, the autonomous vehicle 210 may generate and output a control switch request message for requesting the driver to switch the control from the autonomous driving mode to the driver driving mode (S408).

The autonomous vehicle 210 may determine whether the transfer of control from the system to the driver is completed (S409).

As a result of the determination, when the transfer of the control is normally completed by the driver, the driving mode of the autonomous vehicle 210 may be switched from the autonomous driving mode to the driver driving mode.

As a result of the determination in S409, when the transfer of the control has failed, the autonomous vehicle 210 may record control transfer failure information in the autonomous driving information recording device 223 and transmit the information to the central center 240 (S410 and S411).

Meanwhile, when the control transfer failure information is transmitted to the central center 240, it may be transmitted that emergency measures are required/requested to the autonomous vehicle 210 to an emergency rescue center through the central center 240.

In addition, when the control transfer failure information is transmitted to the central center 240, the fact that the control transfer has failed may be guided to the autonomous vehicle 210 or a terminal owned by the driver through the central center 240.

Figure 5:
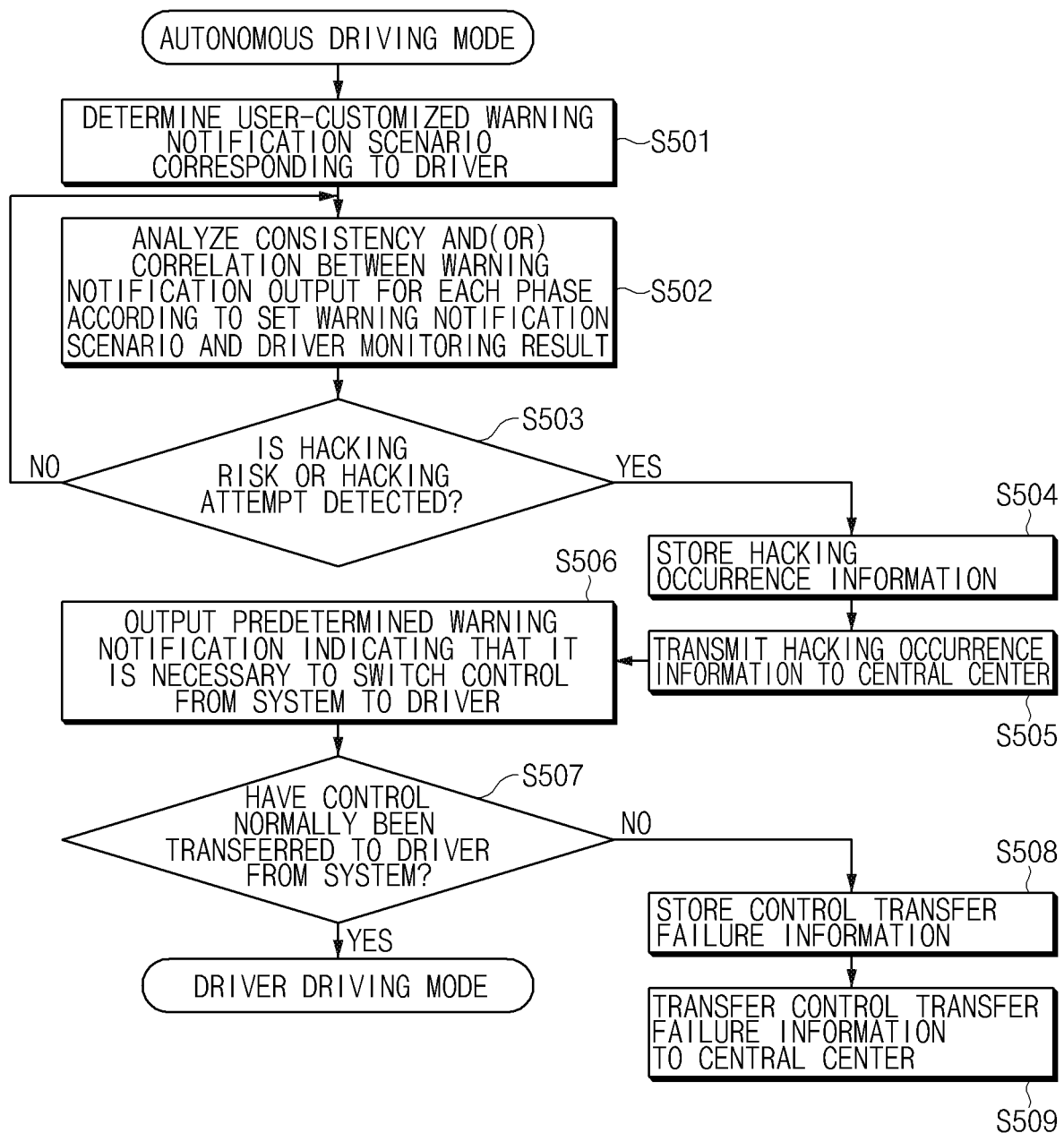
FIG. 5 is a flowchart for describing a procedure for transferring control in an autonomous driving server in one form of the present disclosure.

FIG. 5 is a flowchart for describing a procedure for transferring control in an autonomous driving server in some forms of the present disclosure.

Specifically, FIG. 5 illustrates an operation of an autonomous vehicle for transferring control from an autonomous driving mode to a driver driving mode according to detection of hacking.

Referring to FIG. 5, the autonomous vehicle 210 may determine a user-customized warning notification scenario corresponding to a driver (S501). Here, the user-customized warning notification scenario may be adaptively determined based on a result of learning on the driver's perception-response feature for each warning notification type.

The autonomous vehicle 210 may analyze the consistency and(or) correlation between the warning notification output for each phase according to a set warning notification scenario and a driver monitoring result (S502).

The autonomous vehicle 210 may determine the risk of hacking and (or) whether hacking occurs based on a result of the analysis (S503).

As a result of the determination, when the risk of hacking and/or hacking occurrence is detected, the autonomous vehicle 210 may record the hacking occurrence information in the second storage device 321 and then transmit the hacking occurrence information to the central center 240 (S504 to S505).

Subsequently, the autonomous vehicle 210 may output a warning notification message requesting the driver to switch control from the system to the driver (S506).

The autonomous vehicle 210 may determine whether the transfer of the control from the system to the driver is normally completed (S507).

As a result of the determination, when the transfer of the control is normally completed, the driving mode of the autonomous vehicle 210 may be switched from the autonomous driving mode to the driver driving mode.

As a result of the determination of S507, when the transfer of the control has failed, the autonomous vehicle 210 may record the control transfer failure information in the third storage device 322 and then transmit the control transfer failure information to the central center 240 (S508 to S509).

Figure 6:
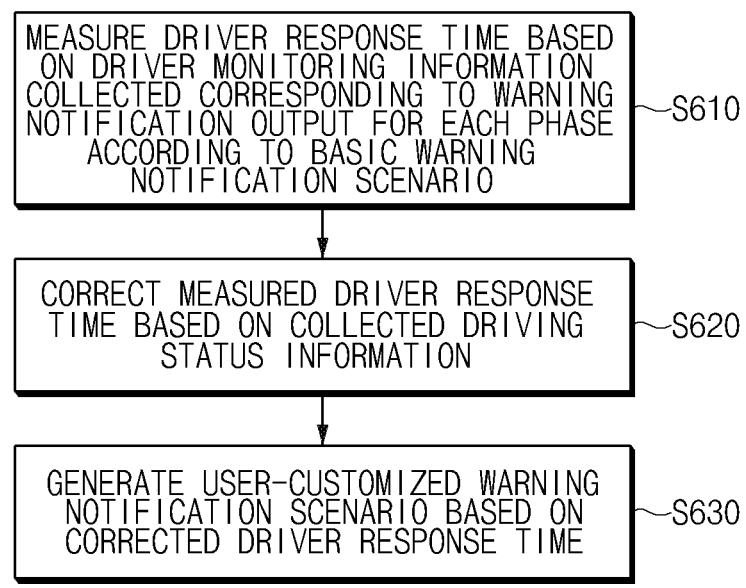
FIG. 6 is a flowchart for describing a learning procedure for generating a user-customized warning notification scenario in an autonomous vehicle in one form of the present disclosure.

FIG. 6 is a flowchart for describing a learning procedure for generating a user-customized warning notification scenario in an autonomous vehicle in some forms of the present disclosure Referring to FIG. 6, the autonomous vehicle 210 may measure a driver response time based on driver monitoring information collected corresponding to a warning notification output for each phase according to a basic warning notification scenario (S610).

The autonomous vehicle 210 may correct the measured driver response time based on collected driving status information (S620).

The autonomous vehicle 210 may generate a user-customized warning notification scenario based on the corrected driver response time (S630).

In some forms of the present disclosure, the autonomous vehicle 210 may determine priorities of warning notification types in the order of shorter corrected driver response times. The autonomous vehicle 210 may generate a user-customized warning notification scenario for the driver in consideration of the determined priorities of the warning notification types.

Figure 7:
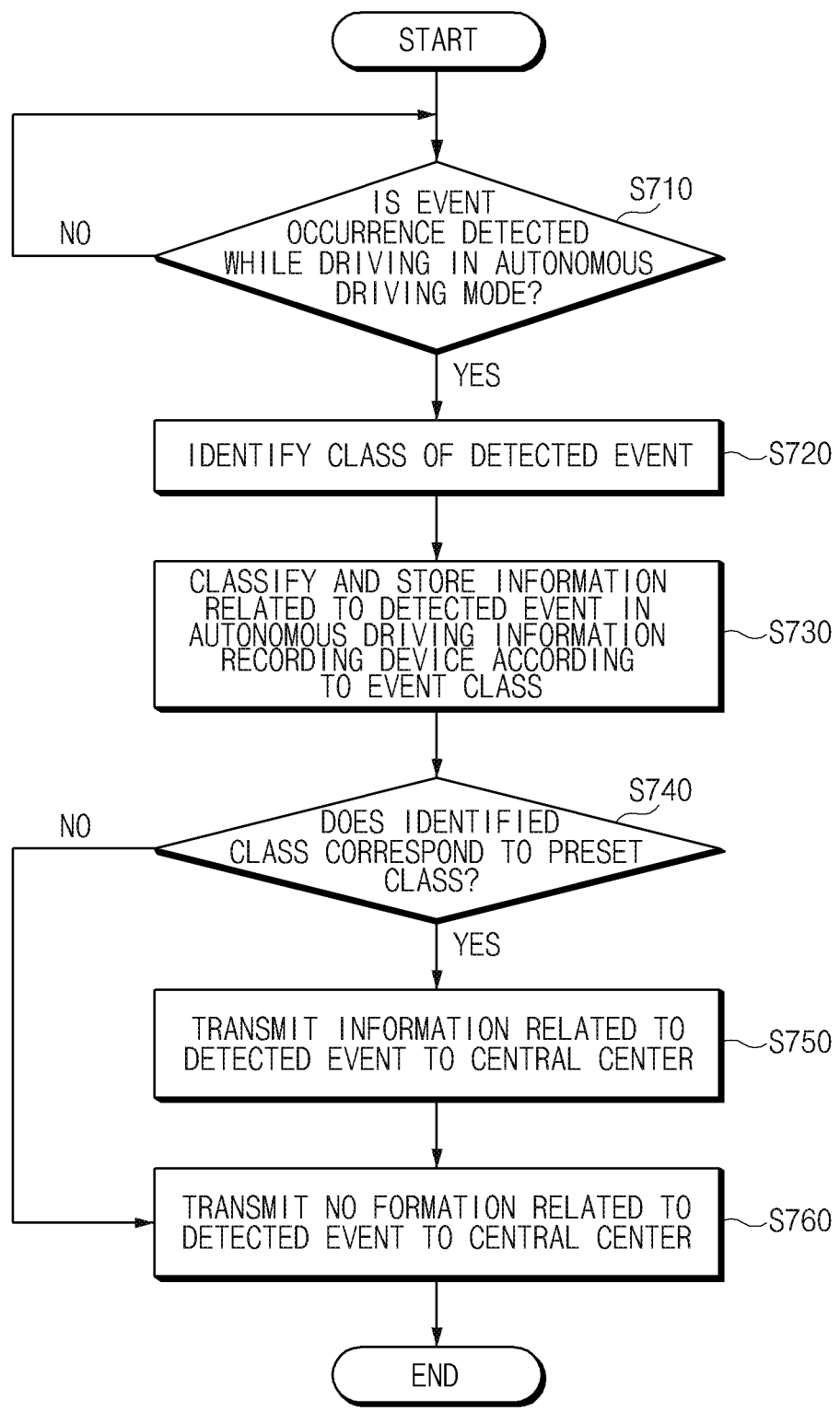
FIG. 7 is a flowchart for describing a method for controlling an autonomous vehicle in one form of the present disclosure.

FIG. 7 is a flowchart for describing a method for controlling an autonomous vehicle in some forms of the present disclosure.

Referring to FIG. 7, the autonomous vehicle 210 may detect whether an event occurs while driving in an autonomous driving mode (S710).

The autonomous vehicle 210 may identify a class of the detected event (S720).

The autonomous vehicle 210 may store event-related information detected according to the class of the identified event in the autonomous driving information recording device (S730). Here, the autonomous vehicle 210 may classify/differentiate the information related to the detected event according to the class of the identified event and store the information related to the detected event in the autonomous driving information recording device.

Specifically, the identified event class may indicate an importance of the detected event. For example, when an event such as a control transfer failure or a traffic accident occurs, the reliability/stability/importance of information stored in an autonomous driving information recording device may be higher than that of other events.

Accordingly, an autonomous vehicle control method according to the present disclosure may classify/differentiate information stored in the vehicle according to the class of the detected event and separately store information in different storage devices according to the class. Here, the different storage devices may include storage devices of which stabilities/securities are different from each other.

The autonomous vehicle 210 may determine whether the identified event class corresponds to a preset class (S740).

As a result of the determination, when the identified event class corresponds to the preset class, the autonomous vehicle 210 may transmit the information related to the detected event to the central center 240 (S750).

On the other hand, as a result of the determination, when the identified event class does not correspond to the preset class, the autonomous vehicle 210 may not transmit the information related to the detected event to the central center 240 (S760).

That is, the autonomous vehicle 210 may adaptively transmit or may not transmit the information related to the detected event to the central center 240 according to the importance of the event. The reason for this is to store related event information safely when an important event occurs.

Specifically, the autonomous vehicle control method according to the present disclosure may store the important event-related information in the autonomous driving information recording device in S730 described above, but more safely store corresponding information in the central center 240 physically spaced apart from the autonomous vehicle 210.

Meanwhile, a preset class which is a standard for handling the information related to the detected event, may be set in advance according to the importance of a detected event or the reliability/stability of the information related to the detected event as described above.

In addition, the autonomous driving recording device may include a plurality of storage devices, and may classify pieces of information to be stored according to classes of the detected events and store the pieces of information in different storage devices.

The central center 240 may request emergency rescue for the autonomous vehicle 210 from an emergency rescue center (including, for example, 119, a police station, a hospital, or an insurance company) according to an emergency rescue request message. In response to an emergency rescue request from the central center 240, the emergency rescue center may dispatch an emergency rescue vehicle to rescue a driver and prevent occurrence of an additional accident. Here, the emergency rescue vehicle may include a fire engine, an ambulance, a police car, but is not limited thereto.

In one form of the present disclosure, when the autonomous vehicle 210 detects a vehicle failure event, a driver distraction event, a hacking occurrence event, or a control transfer failure event, the autonomous vehicle 210 may determine the class of a corresponding event as an emergency reporting class, but is not limited thereto. For example, whether hacking occurs may be detected by a specific ECU (Electric Control Unit) in the autonomous vehicle 210 or a vehicle gateway.

In one form of the present disclosure, when receiving an emergency rescue request message, the central center 240 may transmit emergency occurrence information to the autonomous vehicle 210 or a terminal of the driver of the autonomous vehicle 210 to alert the driver again.

In another form of the present disclosure, when the central center 240 receives the emergency rescue request message, the central center 240 may identify a surrounding vehicle that is driving around the autonomous vehicle 210 and transmit a warning alarm message requesting the identified surrounding vehicle to pay attention to the autonomous vehicle 210.

In some forms of the present disclosure, the steps of FIG. 7 may be implemented to be performed by the control device 225 provided in the autonomous vehicle 210 of FIG. 2.

The operations of the method or the algorithm described in some forms of the present disclosure herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may store information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

Therefore, some forms of the present disclosure are provided to explain the spirit and scope of the present disclosure, but not to limit them, so that the spirit and scope of the present disclosure is not limited by the forms of the present disclosure. The scope of the present disclosure should be construed on the basis of the accompanying claims, and all the technical ideas within the scope equivalent to the claims should be included in the scope of the present disclosure.

The present disclosure may provide an autonomous vehicle control system and an autonomous vehicle control method using the same.

According to the present disclosure, it is possible to provide an autonomous vehicle control system for learning perception-response features to warning notifications for each driver and providing an optimized warning notification scenario for each driver to take appropriate and quick measures in case of vehicle hacking and risk detection.

According to the present disclosure, it is possible to provide an autonomous vehicle driving information recording system capable of actively protecting a driver and preventing a vehicle accident risk by detecting a system malfunction or a hacking situation through a real-time comparison between a warning notification outputted in each warning notification scenario phase and a driver monitoring result, recording a result of the detection in an internal memory of the vehicle and immediately informing a central center of the result of the detection.

According to the present disclosure, it is possible to provide an autonomous vehicle driving information recording system capable of taking appropriate emergency measures in such a way that an autonomous vehicle records control transfer failure information in an internal memory of the vehicle when control of the autonomous vehicle is not normally switched and transmits driver biometric information and surrounding environment information to a central center.

In addition, various effects may be provided that are directly or indirectly understood through the disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An autonomous vehicle comprising:
a driver monitoring device configured to generate driver monitoring information while driving in an autonomous driving mode;
a processor configured to:
measure a perception response time of a driver for each warning notification type based on the driver monitoring information;
learn perception response features of the driver based on the measured perception response time of the driver for each warning notification type;
determine a customized warning notification scenario for the driver based on the learned perception response features; and
output a warning notification based on an output corresponding to each warning notification type; and
an autonomous driving information recording device configured to store autonomous driving information collected during driving;
wherein the processor is further configured to:
record control transfer failure information in the autonomous driving information recording device when it is determined that a transfer of a control from a system to the driver has failed.

2. The autonomous vehicle of claim 1, wherein the autonomous driving information recording device includes a first storage device, a second storage device, and a third storage device, and
wherein at least one of the first storage device, the second storage device, or the third storage device is configured to record the autonomous driving information according to an event.

3. The autonomous vehicle of claim 1, wherein the vehicle further comprises:
a driving environment information collecting device configured to collect driving environment information,
wherein the processor is configured to:

correct the measured perception response time based on the driving environment information; and learn the perception response features of the driver based on the corrected perception response time.

4. The autonomous vehicle of claim 1, wherein the warning notification type includes a visual warning notification type, an audible warning notification type and a tactile warning notification type, and wherein a warning notification message is output according to at least one of the warning notification types in each warning notification scenario.

5. The autonomous vehicle of claim 1, wherein the processor is:

configured to:

determine whether transfer of the control from the system to the driver is normally completed; and switch the autonomous driving mode to a driver driving mode when it is determined that the transfer of the control from the system to the driver is normally completed.

6. The autonomous vehicle of claim 1, wherein the processor is configured to transfer the control transfer failure information to a central center through a communication network.

7. The autonomous vehicle of claim 6, wherein the central center is configured to request emergency measures for the autonomous vehicle from an emergency rescue center when receiving the control transfer failure information.

8. The autonomous vehicle of claim 7, wherein the central center is configured to provide the failure of the control transfer to the autonomous vehicle or a terminal of the driver when receiving the control transfer failure information.

9. The autonomous vehicle of claim 1, wherein the processor is:

configured to:

restore a seat of the autonomous vehicle to a specified position; and operate a seat belt pretensioner when it is determined that the transfer of the control from the system to the driver has failed.

10. The autonomous vehicle of claim 1, wherein the vehicle further comprises:

a biometric information collecting device configured to collect driver biometric information, wherein the processor is configured to:

record driving environment information and the driver biometric information in the autonomous driving information recording device; and transmit the driving environment information and the driver biometric information to a central center when driver distraction is detected based on the driver monitoring information.

11. The autonomous vehicle of claim 10, wherein the central center is configured to receive the driving environment information and the driver biometric information through a communication network.

12. The autonomous vehicle of claim 10, wherein the driver biometric information includes at least one of facial recognition information, pulse information, pupil tracking information, information on respiration number per unit time, electrocardiogram information, body temperature information, electroencephalogram information, or skin electroconductive information, and wherein the driving environment information includes at least one of current time zone information, current location information, driving road information, driving line information, driving speed information, speed limit information of a road on which the autonomous vehicle is driving, indoor and outdoor vehicle video image information, or ambient noise information.

13. An autonomous vehicle control method in an autonomous vehicle, comprising:

collecting driver monitoring information while driving in an autonomous driving mode;

measuring a perception-response time of a driver for each warning notification type based on the driver monitoring information;

learning perception-response features of the driver based on the measured perception-response time of the driver for each warning notification type;

determining a customized warning notification scenario for the driver based on the learned perception-response features;

recording autonomous driving information collected during driving in an autonomous driving information recording device provided in the autonomous vehicle; and recording control transfer failure information in the autonomous driving information recording device when a transfer of a control has failed from a system to the driver.

14. The autonomous vehicle control method of claim 13, wherein the method further comprises:

collecting driving status information;

storing the driving status information in the autonomous driving information recording device;

correcting the measured perception-response time based on the driving status information; and learning the perception-response features of the driver based on the corrected perception-response time.

15. The autonomous vehicle control method of claim 13, wherein the method further comprises:

detecting driver distraction based on the driver monitoring information;

collecting driver biometric information and driving environment information when the driver distraction is detected;

recording the driver biometric information and the driving environment information in the autonomous driving information recording device; and transmitting, to a central center, the driver biometric information and the driving environment information.

16. An autonomous vehicle control method comprising:

detecting an event while driving in an autonomous driving mode;

identifying a class of the detected event;

classifying information related to the detected event according to the class of the identified event and storing the information related to the detected event in an autonomous driving information recording device;

transmitting the information related to the detected event to a central center when the class of the identified event corresponds to a preset level; and not transmitting the information related to the detected event to the central center when the class of the identified event does not correspond to the preset level.

17. The autonomous vehicle control method of claim 16, wherein the event while driving in the autonomous driving mode includes at least one of a hacking occurrence event, a control transfer failure event, a vehicle failure event, or a driver distraction event.

18. The autonomous vehicle control method of claim 16, wherein the preset level is set in advance based on at least one of reliability, stability, or importance of the information related to the detected event.

19. The autonomous vehicle control method of claim 16, wherein the classification and storing of the information further includes:
classifying the information related to the detected event according to the class of the identified event and storing the classified information in a plurality of storage devices, wherein the autonomous driving information recording devices comprises the plurality of storage devices.

20. An autonomous vehicle comprising:
an autonomous driving information recording device configured to store autonomous driving information collected during driving, and
a control device configured to:
classify information related to a detected event according to a class identified corresponding to the detected event;
store the information in the autonomous driving information recording device when the event is detected while driving in an autonomous driving mode;
transmit the information related to the detected event when the identified class corresponds to a preset class; and
not transmit the information related to the detected event when the identified class does not correspond to the preset class.

21. The autonomous vehicle control method of claim 20, wherein the event while driving in the autonomous driving mode includes at least one of a hacking occurrence event, a control transfer failure event, a vehicle failure event, or a driver distraction event.

22. The autonomous vehicle control method of claim 20, wherein the preset level is set in advance based on at least one of reliability, stability, or importance of the information related to the detected event.

23. The autonomous vehicle control method of claim 20, the control device is configured to:
classify information related to the detected event according to a class of the identified event and store the information in a plurality of storage devices, wherein the autonomous driving information recording device comprises the plurality of storage devices.

24. An autonomous vehicle comprising:
a driver monitoring device configured to generate driver monitoring information while driving in an autonomous driving mode;
a processor configured to:
measure a perception response time of a driver for each warning notification type based on the driver monitoring information;
learn perception response features of the driver based on the measured perception response time of the driver for each warning notification type;
determine a customized warning notification scenario for the driver based on the learned perception response features; and
output a warning notification based on an output corresponding to each warning notification type;
an autonomous driving information recording device configured to store autonomous driving information collected during driving,
wherein the processor is configured to:
determine whether hacking occurs by identifying consistency between a driver monitoring result and a corresponding warning notification output for each warning notification scenario; and
record hacking occurrence information in the autonomous driving information recording device when the hacking is determined to occur.

25. The autonomous vehicle of claim 24, wherein the hacking occurrence information is transmitted to a central center through a communication network.

26. The autonomous vehicle of claim 24, wherein the controller is configured to switch a control from a system to the driver when the hacking is determined to occur.

27. An autonomous vehicle control method in an autonomous vehicle, comprising:
collecting driver monitoring information while driving in an autonomous driving mode;
measuring a perception-response time of a driver for each warning notification type based on the driver monitoring information;
learning perception-response features of the driver based on the measured perception-response time of the driver for each warning notification type;
determining a customized warning notification scenario for the driver based on the learned perception-response features;
recording autonomous driving information collected during driving in an autonomous driving information recording device provided in the autonomous vehicle;
determining whether hacking occurs by identifying consistency between a driver monitoring result and a corresponding warning notification output for each warning notification scenario; and
when the hacking is determined to occur, recording hacking occurrence information in the autonomous driving information recording device.

28. The autonomous vehicle control method of claim 27, further comprising:
when the hacking is determined to occur, outputting a predetermined warning notification informing the driver of a need for a transfer of a control from a system to the driver.

* * * * *